(12) United States Patent
VanEyll et al.

(10) Patent No.: US 10,171,023 B2
(45) Date of Patent: Jan. 1, 2019

(54) MOTOR STARTER APPARATUS WITH START-UP FAULT DETECTION CAPABILITY

(71) Applicant: EATON CORPORATION, Cleveland, OH (US)

(72) Inventors: Kevin Lee VanEyll, Asheville, NC (US); Benjamin Stewart Wells, Arden, NC (US); Gary Bruce Tweed, Weaverville, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/655,094

(22) Filed: Jul. 20, 2017

(65) Prior Publication Data

US 2017/0317637 A1    Nov. 2, 2017

Related U.S. Application Data

(63) Continuation of application No. 14/969,502, filed on Dec. 15, 2015, now Pat. No. 9,742,344.

(51) Int. Cl.
*G01R 31/02* (2006.01)
*H02P 29/024* (2016.01)
*H02P 1/02* (2006.01)

(52) U.S. Cl.
CPC ............ *H02P 29/024* (2013.01); *H02P 1/022* (2013.01)

(58) Field of Classification Search
CPC .................................................... H02P 29/024
See application file for complete search history.

(56) References Cited

U.S. PATENT DOCUMENTS

| 6,285,936 B1* | 9/2001 | Bohner ................ B62D 5/06 180/422 |
| 2008/0165457 A1 | 7/2008 | Premeriani et al. |
| 2010/0302700 A1 | 12/2010 | Kellis et al. |
| 2015/0276880 A1 | 10/2015 | Sharma et al. |

OTHER PUBLICATIONS

*Solid-State Soft Start Motor Controller and Starter*, Eaton Corporation Application Paper AP03902001E; Feb. 2011, 32 pages.

* cited by examiner

*Primary Examiner* — Karen Masih
(74) *Attorney, Agent, or Firm* — Ward and Smith, P.A.

(57) ABSTRACT

A motor starter apparatus includes at least one semiconductor switch configured to selectively couple a power source to a motor, at least one current sensor configured to generate a current sense signal indicative of a current provided via the at least one semiconductor switch, and a control circuit coupled to the at least one current sensor and configured to cause the at least one semiconductor switch to momentarily couple the power source to the motor and identify a fault based on a behavior of the current sense signal in response to the momentary coupling. The control circuit may be configured to identify the fault responsive to detecting that a rate of change of the current in response to the momentary coupling meets a predetermined criterion.

11 Claims, 4 Drawing Sheets

MOTOR STARTER APPARATUS WITH START-UP FAULT DETECTION CAPABILITY

CROSS-REFERENCE TO RELATED APPLICATION

This application is a Continuation of U.S. application Ser. No. 14/969,502, filed on Dec. 15, 2015, the disclosure of which is incorporated herein by reference in its entirety.

BACKGROUND

The inventive subject matter relates to motor control apparatus and methods of operation thereof, more particularly, to motor starters and methods of operating the same.

Motor starters are commonly used with industrial electric motors. Typical solid-state motor starters control starting characteristics to meet application requirements, including acceleration and deceleration time, starting current and motor torque. Soft starters are commonly used to limit inrush current when the motor is first coupled to a power source. Large inrush currents may cause voltage dips that may negatively affect other loads coupled to the same source. High starting torque may also cause electromechanical shock that can damage windings and other components of the motor, as well as drive trains and other components mechanically coupled to the motor.

Soft motor starters may control voltage and/or current provided to the motor. For example, some soft starters may use silicon-controlled rectifiers (SCRs) that are connected in series between the power source and the load. During a startup process, the SCRs may be selectively gated "on" to gradually increase the speed of the motor. When the motor has reached a desired speed, a bypass contactor may be closed to bypass the SCRs and reduce losses. Operations of soft motor starters are described in "Solid-state soft start motor controller and starter," Application Paper AP 03902001E (Eaton Corp. 2011).

SUMMARY

Some embodiments of the inventive subject matter provide a motor starter apparatus including at least one semiconductor switch configured to selectively couple a power source to a motor, at least one current sensor configured to generate a current sense signal indicative of a current provided via the at least one semiconductor switch, and a control circuit coupled to the at least one current sensor and configured to cause the at least one semiconductor switch to momentarily couple the power source to the motor and to identify a fault based on a behavior of the current sense signal in response to the momentary coupling. The control circuit may be configured to identify the fault responsive to detecting that a rate of change of the current in response to the momentary coupling meets a predetermined criterion.

In some embodiments, the control circuit may be configured to detect that the rate of change of the current in response to the momentary coupling meets the predetermined criterion responsive to a magnitude of the current sense signal exceeding a predetermined magnitude. The control circuit may be configured to detect that the rate of change of the current in response to the momentary coupling meets the predetermined criterion responsive to a comparison of the current sense signal to a reference signal, which may be user adjustable.

Further embodiments provide a motor starter apparatus including at least one semiconductor switch configured to selectively couple a power source to a motor, at least one current sensor configured to sense a current provided from the power source, and a control circuit coupled to the at least one current sensor and configured to cause the at least one semiconductor switch to momentarily couple the power source to the motor and to identify a fault based on a comparison of a reference signal to a current sense signal generated by the current sensor in response to the momentary coupling. The control circuit may include a comparison circuit configured to generate a fault indication signal responsive to the comparison of the reference signal to the current reference signal. The comparison circuit may include a window comparator circuit having a detection window defined by first and second reference signals. The control circuit may further include a reference generator circuit configured to generate the first and second reference signals.

Further embodiments provide methods of operating a motor starter. The methods include the method operating at least one semiconductor switch of the motor starter to momentarily couple a power source to a motor, responsively generating a current sense signal indicative of a current provided via the at least one semiconductor switch, and identifying a fault based on a behavior of the current sense signal generated in response to the momentary coupling.

DETAILED DESCRIPTION

Figure 1:
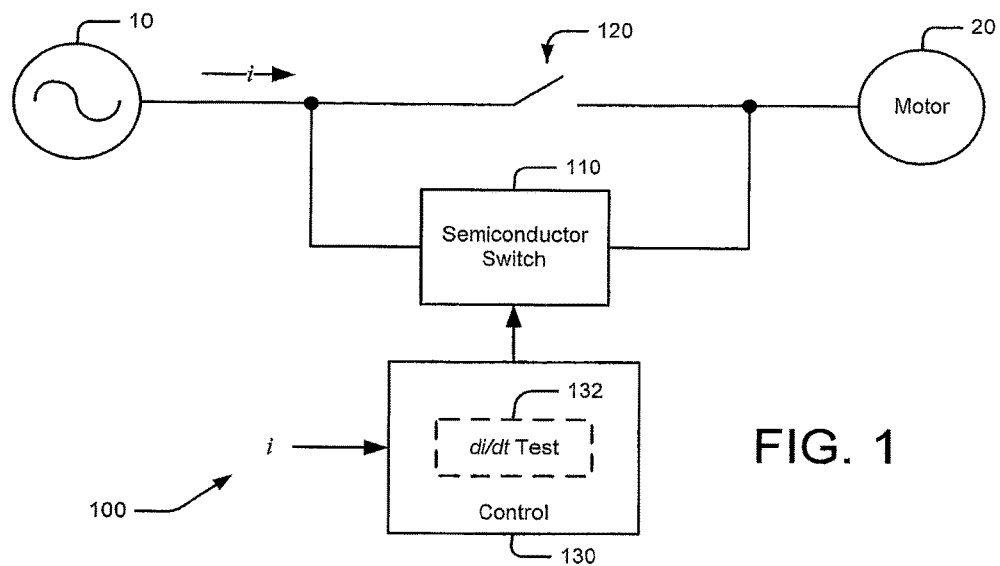
FIG. 1 is a schematic diagram illustrating a motor starter apparatus according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that industrial electric motors may employ long cables and/or power factor correction capacitors that can have high capacitances associated therewith, and such high capacitance may cause failure of solid-state motor starters during start-up due to an excessive rate of change of the current (di/dt). Stray capacitance between conductive in a motor cable may not be known, and power factor correction capacitors may be inadvertently left connected at startup, which can result in failure of switching devices (e.g., SCRs) of a motor starter when the starter is activated. Some embodiments of the inventive subject matter may use a current rate of change detector that may be used to detect such start-up fault conditions and prevent starter operation that may result in damage. In some embodiments, an SCR of a motor starter may he fired at a relatively small angle to produce a narrow voltage pulse. A current produced by this pulse may be detected using a high-speed current sensor, such as a ferrite current transformer or Rogowski coil sensor. The current sense signal produced by the sensor may be compared to a reference signal. The current sense signal exceeding this reference signal may indicate an excessive current rate of change that may he associated with the presence of a power factor correction capacitor, excessive line capacitance or other fault condition. A fault indication signal may be asserted based on the comparison and used to provide an alert to an operator and/or inhibit further operation of the starter to prevent damage.

FIG. 1 illustrates a motor starter 100 according to some embodiments of the inventive subject matter. The starter 100 includes at least one semiconductor switch 110 and at least one bypass switch 120, each of which is configured to couple a power source 10 to a motor 20. A control circuit 130 controls the at least one semiconductor switch 110 and the at least one bypass switch 120. The control circuit 130 may be configured to provide a soft start operation in which the at least one semiconductor switch 110 is modulated while the bypass switch is open to gradually accelerate the motor 20. Once the motor 20 has reached a desired state, the at least one bypass switch 120 may be closed and the at least one semiconductor switch 110 opened.

As further illustrated, the control circuit 130 may be configured to implement a startup test controller 132 that operates the at least one semiconductor switch 110 in a constrained before proceeding with a startup procedure to detect current levels that indicate conditions that may cause damage to the starter 100 during startup. As explained above, output line and/or load conditions for the starter 100 may cause current rate of change levels associated with fault conditions that may damage the starter 100 (e.g., the at least one semiconductor switch 110) during startup. For example, such fault conditions may include inadvertent connection of switchable power factor correction capacitors in parallel with the motor 20, excessive capacitance between conductors of relatively long cables (e.g., in undersea applications) and/or short circuits.

The startup test controller 132 may modulate the at least one semiconductor switch 110 to generate a controlled-duration voltage pulse that generates a current i that can be monitored to determine whether such a damaging load condition is present, without causing current levels that may damage the starter 100. For example, if a rate of change of the current i meets a predetermined criterion (e.g., the current i exceeds a predetermined threshold in response to the limited-duration voltage pulse), such a condition may indicate the presence of a fault, such as a short, excessive load capacitance, excessive line capacitance, or the like. If a fault condition is detected, the fault condition may be indicated using, for example, a fault indication signal that may be transmitted to an operator. Such a fault indication signal may also be used to inhibit operation of the starter 100 and prevent damage to the starter 100.

Figure 2:
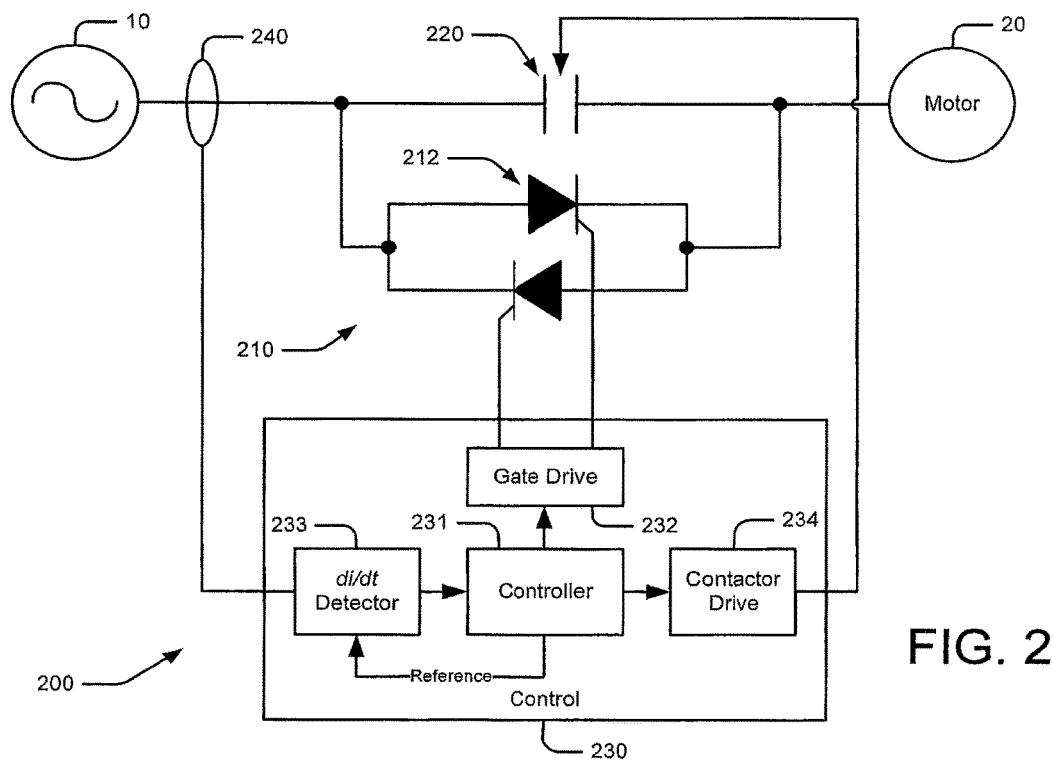
FIG. 2 is a schematic diagram illustrating a motor starter apparatus according to further embodiments.

FIG. 2 illustrates an example of a starter 200 according to further embodiments. The starter 200 includes at least one semiconductor switch 212 including anti-parallel connected silicon-controlled rectifiers (SCRs). Gate terminals of the SCRs of the at least one semiconductor switch 212 may be driven by a gate drive circuit 232 of a control circuit 230. The gate drive circuit 232 is controlled by a controller 231, which may include, for example, a DSP-based microcontroller or similar device. The controller 231 may also control a contactor drive circuit 234 that drives a bypass contactor 220.

The starter 200 further includes at least one current sensor 240, which senses a current passing between a power source 10 and a motor 20. The at least one current sensor 240 may include at least one high-frequency current sensor, such as a ferrite current transformer or a Rogowski coil current sensor. The control circuit 230 further includes a detector circuit 233, which is configured to receive at least one current sense signal generated by the at least one current sensor 240 and to responsively generate a fault indication signal that is provided to the controller 232. As illustrated, the detector circuit 233 may generate the fault indication signal responsive to a comparison of the current sense signal to a reference signal provided by the controller 231.

Figure 3:
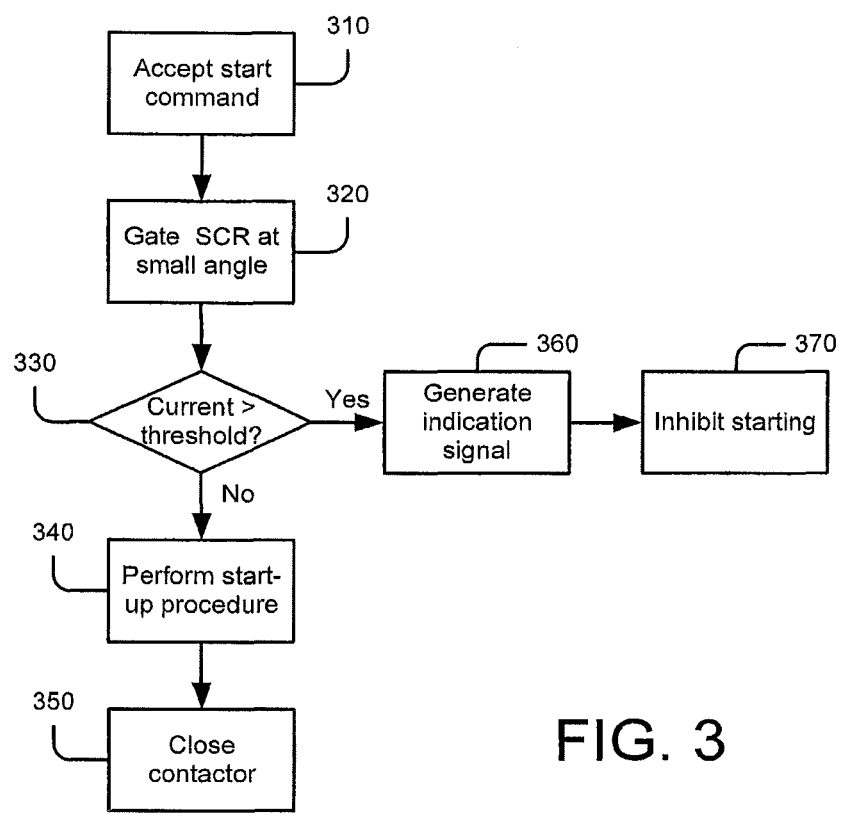
FIG. 3 is a flowchart illustrating operations of the apparatus of FIG. 2 according to some embodiments.

FIG. 3 illustrates exemplary operations of the starter 200 according to some embodiments. Responsive to a start command (block 310), the controller 231 may gate the SCRs of the at least one semiconductor switch 212 at a relatively low phase angle to apply a momentary voltage pulse at the output of the starter 200 (block 320). The detector circuit 233 may compare the current reference signal to a current sense signal generated by the current sensor 240 in response to the voltage pulse (Block 330). If the current sense signal exceeds the limit defined by the reference signal, indicating an undesirable current rate of change corresponding to a short circuit and/or excessive capacitance, the detector circuit 233 may generate a fault indication signal (block 360). The fault indication signal may be used to inhibit motor starting (block 370). For example, the fault indication signal may be provided to the controller 231, which may responsively inhibit activation of the gate drive circuit 232. If the sensed current is not excessive, the startup procedure may proceed (block 340). After startup is accomplished, the bypass contactor 220 may be closed and the at least one semiconductor switch 210 opened (block 350).

Figure 4:
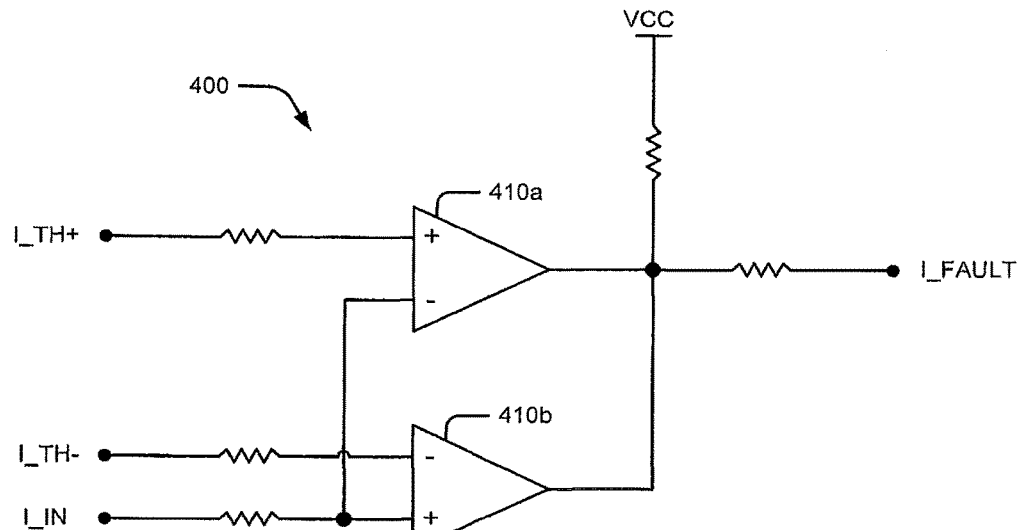
FIG. 4 is a schematic diagram illustrating a current detection circuit according to some embodiments.
Figure 5:
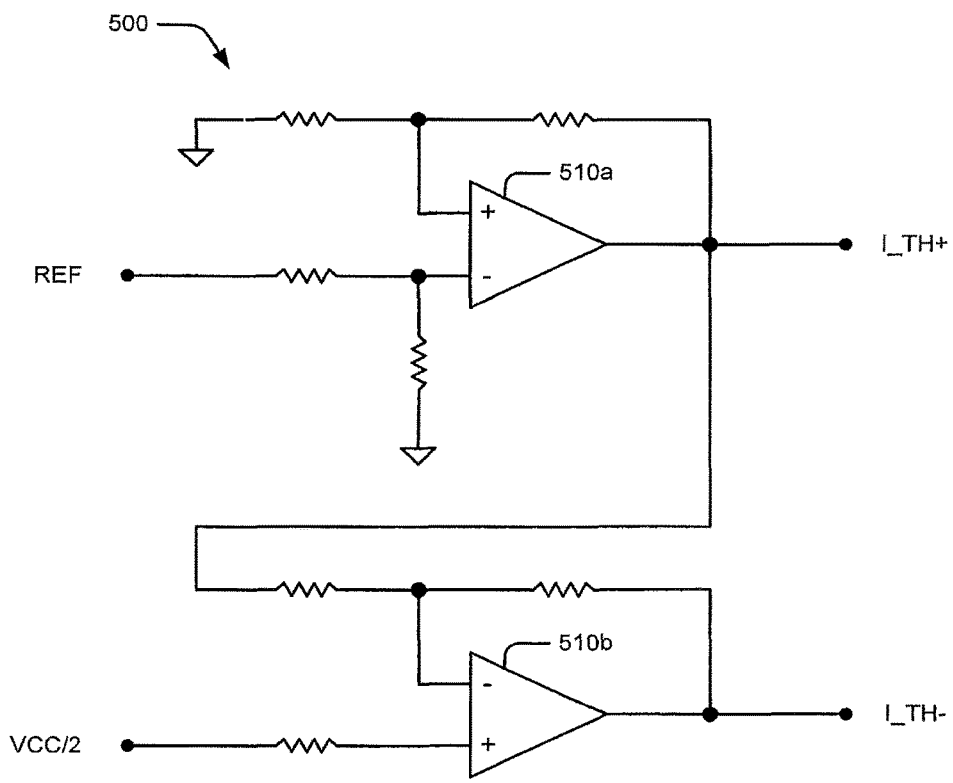
FIG. 5 is a schematic diagram illustrating a current reference signal generator circuit according to some embodiments.

FIGS. 4 and 5 illustrate a window comparator circuit 400 and reference generator circuit 500 that may be used in the detector 233 of FIG. 2. The window comparator circuit 400 includes first and second comparators 410a, 410b that are configured to receive a positive current threshold signal I_TH+ and a negative current threshold signal I_TH−, respectively, which define a detection window. The comparators 410a, 410b compare a current sense signal I_IN to the respective positive and negative current threshold signals I_TH+, I_TH−. If the current sense signal is outside of the detection window, i.e., greater than the positive current threshold signal I_TH+ or less than the negative current threshold signal I_TH−, a fault signal I_FAULT is driven to a logic "low", indicating a current condition associated with a possible fault. If the current sense signal I_IN stays within the limits defined by the positive and negative current threshold signals I_TH+, I_TH−, the fault signal I_FAULT maintains a logic "low" state, indicating absence of a fault condition. As described above, a fault condition may include, for example, the presence of power factor correction capacitors, excessive line capacitance and/or a short circuit. The controller 231 may monitor the fault indication signal I_FAULT and responsive take further actions based on the state of the fault indication signal I_FAULT. For example, if the controller 231 is microcontroller-based, the fault indication signal I_FAULT may be used as an interrupt, with assertion of the interrupt triggering generation of an alarm signal and/or inhibition of further operations, as described above.

Referring to FIG. 5, the reference generator circuit 500 generates the positive and negative current threshold signals I_TH+, I_TH− responsive to a reference signal REF. In particular, the reference generator circuit 500 includes first and second operational amplifiers 510a, 510 that generate respective ones of the positive and negative current threshold signals I_TH+, I_TH− from the reference signal REF. The reference signal REF may be provided by the controller 213, and may be user adjustable responsive to a control input, such as a user-generated command.

Figure 6:
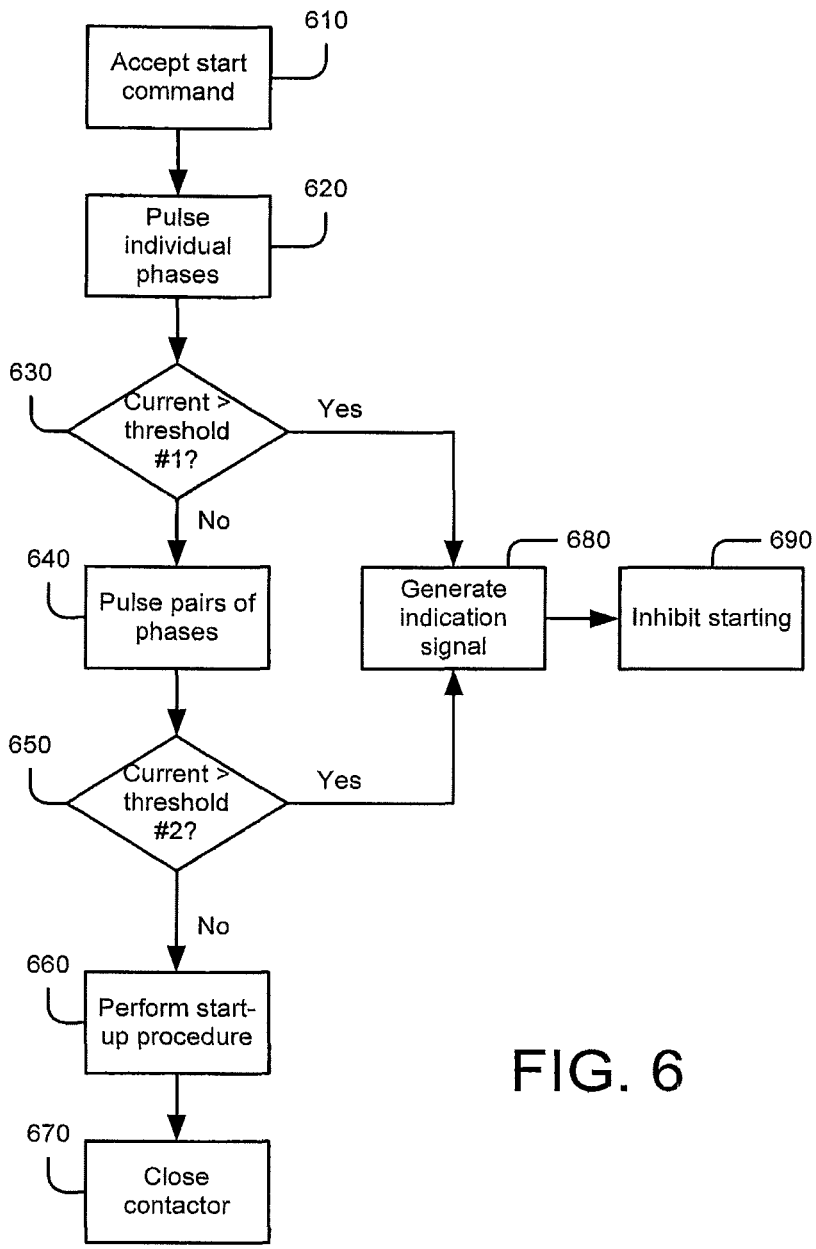
FIG. 6 is a flowchart illustrating operations of the apparatus of FIG. 2 according to further embodiments.

In three-phase implementations according to some embodiments, different types of such pulse tests may be conducted to detect line-to-line or line-to-ground conditions. Referring to FIG. 6, in response to a start command (block 610), individual phases may be pulsed to test line-to-ground conditions (block 620). If any of the current pulses exceeds a first predetermined threshold, a fault indication signal may be asserted (blocks 630, 680). If not, pairs of phases may be pulse to test line-to-line conditions (block 640). If the currents generated by any of these pulses exceed a second predetermined threshold, a fault indication signal may be asserted (blocks 650, 680). The first and second thresholds may be the same or different. If both tests are passed, a start up procedure may be performed (block 660), concluding with closure of the bypass contactor 220. If either test is failed, startup may be inhibited (block 690).

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
at least one semiconductor switch;
at least one current sensor configured to sense a current provided to a load via the at least one semiconductor switch; and
a control circuit configured to cause the at least one semiconductor switch to couple a power source to the load for an interval having a duration of less than one-half of a period of an AC voltage of the power source and to detect a rate of change of the sensed current in response to the coupling.

2. The apparatus of claim 1, wherein the control circuit is further configured to identify a fault in response to the detected rate of change meeting a criterion.

3. The apparatus of claim 1, wherein the control circuit is further configured to inhibit provision of power to the load via the at least one semiconductor switch responsive to the detected rate of change meeting a criterion.

4. The apparatus of claim 1, wherein the load comprises a motor.

5. An apparatus comprising:
at least one semiconductor switch; and
a control circuit configured to cause the at least one semiconductor switch to initially couple a power source to a de-energized load for less than one half of one period of an AC voltage of the power source and to condition further provision of power to the load via the at least one semiconductor switch based on a current through the at least one semiconductor switch during the initial coupling.

6. The apparatus of claim 5, wherein the control circuit is configured to detect a rate of change of the current and to condition the further provision of power to the load based on the detected rate of change.

7. The apparatus of claim 5, wherein the load comprises a motor.

8. A method comprising:
coupling a power source to a load via at least one semiconductor switch for an interval having a duration of less than one half of a period of an AC voltage of the power source; and
detecting a rate of change of current through the at least one semiconductor switch in response to the coupling.

9. The method of claim 8, further comprising identifying a fault in response to the detected rate of change meeting a criterion.

10. The method of claim 8, further comprising inhibiting provision of power to the load via the at least one semiconductor switch responsive to the detected rate of change meeting a criterion.

11. The method of claim 8, wherein the load comprises a motor.

* * * * *